(12) United States Patent
Burkhardt et al.

(10) Patent No.: US 10,697,373 B2
(45) Date of Patent: Jun. 30, 2020

(54) ACTIVE COMBUSTION CONTROL VALVE, SYSTEM AND METHOD

(71) Applicant: WASK Engineering Inc., Cameron Park, CA (US)

(72) Inventors: Wendelin M. Burkhardt, Cameron Park, CA (US); John M. Crapuchettes, Boise, ID (US)

(73) Assignee: WASK ENGINEERING INC., Cameron Park, CA (US)

( * ) Notice: Subject to any disclaimer, the term of this patent is extended or adjusted under 35 U.S.C. 154(b) by 812 days.

(21) Appl. No.: 15/193,467

(22) Filed: Jun. 27, 2016

(65) Prior Publication Data

US 2017/0370293 A1 Dec. 28, 2017

(51) Int. Cl.
*F02C 7/232* (2006.01)
*F02C 9/26* (2006.01)
*F16K 31/00* (2006.01)

(52) U.S. Cl.
CPC .............. *F02C 7/232* (2013.01); *F02C 9/26* (2013.01); *F16K 31/007* (2013.01); *F05D 2220/32* (2013.01); *F05D 2240/35* (2013.01); *F05D 2260/964* (2013.01)

(58) Field of Classification Search
CPC ...... F02C 9/28; F02C 7/232; F05D 2260/964; F05D 2270/333; F23R 2900/00013; F16K 31/007; F16K 31/126; F16K 41/10
USPC .................................................. 251/335.3
See application file for complete search history.

(56) References Cited

U.S. PATENT DOCUMENTS

| | | | | |
|---|---|---|---|---|
| 3,399,695 A * | 9/1968 | Stehlin | ................... | F16K 41/103 137/551 |
| 5,448,882 A * | 9/1995 | Dyer | ....................... | F02C 7/228 60/39.281 |
| 6,253,736 B1 * | 7/2001 | Crofts | .................. | F02M 47/027 123/467 |
| 6,313,568 B1 * | 11/2001 | Sullivan | ............... | F02M 47/027 310/346 |
| 7,007,476 B2 * | 3/2006 | Mains | ..................... | F23N 1/002 60/734 |
| 2012/0273061 A1 * | 11/2012 | Hidaka | ..................... | F16K 7/14 137/334 |
| 2013/0000759 A1 * | 1/2013 | Killeen | .................. | F04B 49/03 137/565.16 |

* cited by examiner

*Primary Examiner* — Todd E Manahan
*Assistant Examiner* — Katheryn A Malatek
(74) *Attorney, Agent, or Firm* — Tarolli, Sundheim, Covell & Tummino LLP (57) ABSTRACT

Various examples of an active combustion control valve, combustion systems, and method of controlling the flow of liquid fluid in a gas combustion system are described. In one aspect of the present invention, an active combustion control valve includes a core valve housing, an actuator, a valve seat in communication with the actuator, and a passageway in fluid communication with the core valve housing and the valve seat. The control valve is responsive to change in voltage applied to the actuator and is capable of a first condition permitting a first fluid flow through the passageway and a second condition permitting a second fluid flow through the passageway, the first fluid flow being different than the second fluid flow. The combustion control valve is small, robust, responsive and self-cooling to operate in severe thermal environment.

29 Claims, 8 Drawing Sheets

ACTIVE COMBUSTION CONTROL VALVE, SYSTEM AND METHOD

STATEMENT REGARDING FEDERALLY SPONSORED RESEARCH

This invention was made with government support under FAR Clause 52.227-11 awarded by NASA. The U.S. Government may have certain rights in the invention.

TECHNICAL FIELD

Aspects of the present invention relate generally to active combustion control valves, systems comprising one or more active combustion control valves, and a method for controlling flow of liquid fluid in a gas combustion system.

BACKGROUND OF THE INVENTION

Active Combustion Instability Control (ACIC) is the approach in which a combustion process is controlled by modifying the pressure within the system. This is done by sensing the amplitudes and frequencies of acoustic pressure waves and then modulating fuel injection at a frequency which dampens the naturally occurring thermo-acoustic instabilities. Over the past decade, research into active combustion control has yielded impressive results in suppressing thermo-acoustic instabilities and widening the operational range of gas-turbine combustors.

A known hurdle to effective implementation of the active combustion control is the availability of valves and actuators that provide adequate flow modulation control authority at low fuel flow rates. Recent valve technology focuses on the valves designed to modulate the entire fuel flow to the main combustor. These are large valves that must be located in a benign environment to operate properly. This location limits flow control authority for low flow rates when located far from the harsh thermal environment of a fuel injector.

SUMMARY OF THE INVENTION

Various combustion control valves, systems and methods relating to combustion systems are disclosed. In one aspect of the present invention, an active combustion control valve includes a core valve housing, an actuator, a valve seat in communication with the actuator, and a passageway in fluid communication with the core valve housing and the valve seat. The control valve is responsive to change in an electrical signal applied to the actuator and is capable of a first condition permitting a first fluid flow through the passageway and a second condition permitting a second fluid flow through the passageway, the first fluid flow being different than the second fluid flow. The combustion control valve is small, robust, responsive and self-cooling to operate in severe thermal environment.

In another aspect, an active combustion control valve includes a core valve housing, an actuator disposed within the core valve housing, a valve seat, and a poppet in communication with the actuator, a flexible member operably connected to the core valve housing and the poppet and a fluid passageway for directing fluid along at least a portion of the core housing for cooling.

In another aspect of the present invention, a combustion system includes a combustion engine and an active combustion control valve comprising a core valve housing, an actuator, a valve seat in communication with the actuator, and a passageway in fluid communication with the core valve housing and the valve seat. The control valve is responsive to a change in voltage applied to the actuator and is capable of a first condition permitting a first fluid flow through the passageway and a second condition permitting a second fluid flow through the passageway, the first fluid flow being different than the second fluid flow.

In yet another aspect, the present invention provides for a method of controlling the flow of fluid in a combustion engine. The method includes passing fluid through a passageway of an active combustion control valve; cooling the control valve with the fluid flowing through the passageway of the valve; and applying voltage to an actuator of the control valve to cause the actuator to move to change the flow of the fluid that exits the control valve.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

Figure 1:
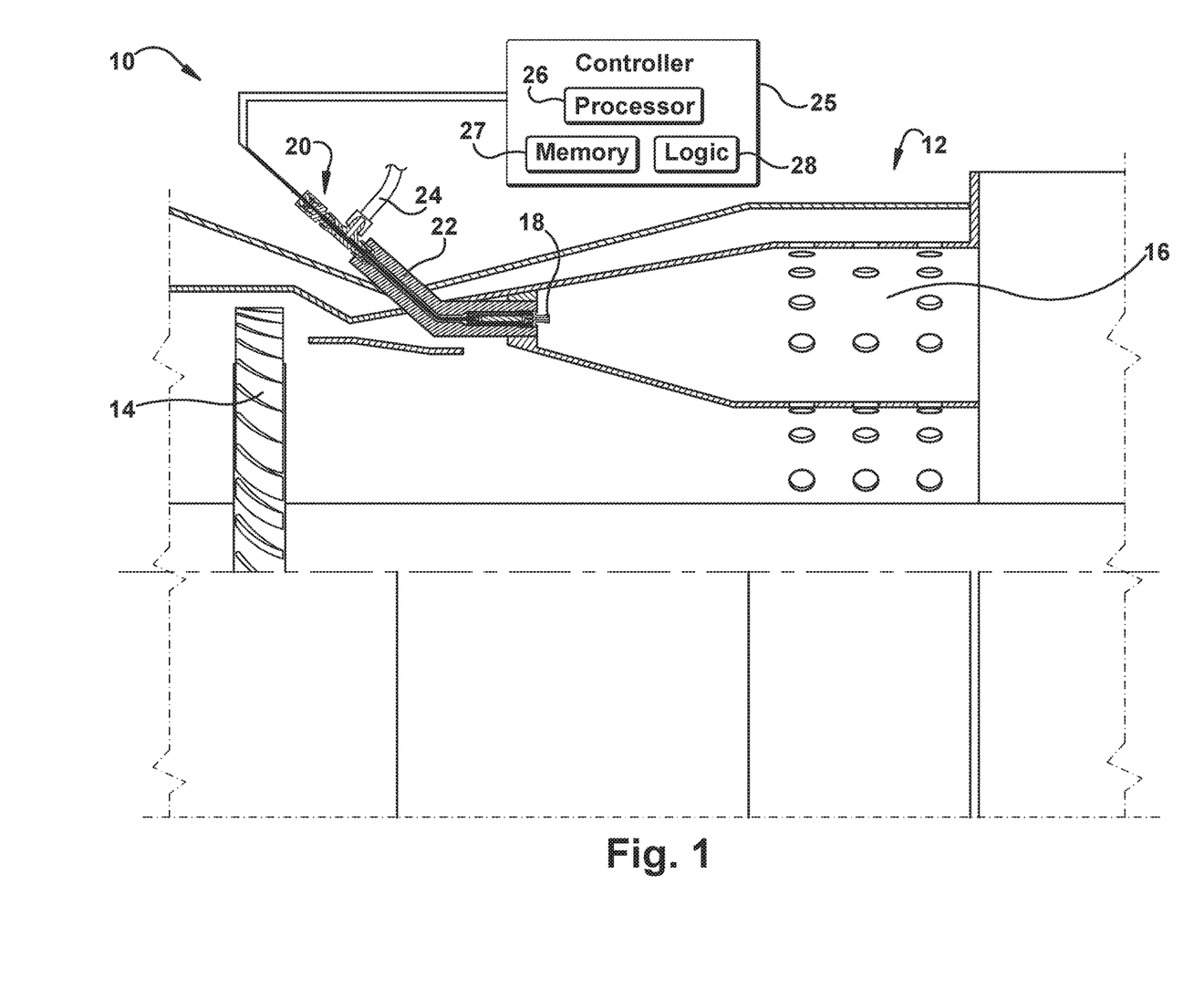
FIG. 1 is a schematic cross-sectional view of a combustion system which includes a jet engine and an active combustion control valve, according to an example of the present invention.

Various embodiments of active combustion control valves, combustion systems, and method of the present invention are provided. FIG. 1 is a schematic cross-sectional view of a combustion system 10. Combustion system 10 includes a gas combustion engine 12 having a compressor 14, a combustor 16, and an injector 18. Injector 18 injects fuel into the combustor 16, which includes one or more burners that ignites the fuel. Although examples of the present invention described herein relate to aviation gas turbines and combustion engines that are jet engines, it should be understood that the teachings and concepts herein apply to a variety of combustion systems, for example, combustion systems that include combustion engines for use in stationary plant operations, such as gas turbines.

Combustion system 10 of the present invention further includes an active combustion control valve (ACCV) or control valve 20 to modulate the main combustor fluid flow to suppress the naturally occurring thermo-acoustic instabilities. Control valve 20 can operate in a harsh, high temperature environment, for example temperatures exceeding 1,000° F. and even above 1,200° F. where it is co-located with injector 18. As used herein, the term "co-located" means, for example, control valve 20 is in close proximity to injector 18, for example less than six inches from injector 18, in another example less than about 2 or about 3 inches from the injector, and in another example, control valve 20 can be attached directly to the upstream inlet of the injector 18 as shown in FIG. 1. This close proximity of control valve 20 to injector 18 allows for modulation of fluid flow and engine efficiency without impacting emissions as contrasted to more remote locations where fluid viscosity can dampen the fluid pulses. Control valve 20 can also be sized to fit into the confined space of the injector strut 22 as shown. The close proximity of the control valve 20 to injector 18 provides a more responsive and robust modulation of fluid flow. In addition, the active combustion control valve is self-cooling to operate in severe thermal combustion environments that far exceed the operating temperature of components of the active combustion control valve.

In another example, combustion system 10 includes a controller 25 in communication with control valve 20. Both control valve 20 and controller 25 can transmit and receive messages via hard-wire connections, or via wireless antennas. Controller 25 includes a processor 26 and a memory 27. The memory is a non-transitory, machine-readable medium that can be employed to implement systems and methods, for example based on computer-executable instructions of computer logic 28 run by the controller 25. Controller 25 also receives signals from sensors, for example pressure transducers, located in and/or near the combustor and transmits signals to control valve 20 to command the valve to modulate the fluid flow through the control valve. The controller receives inputs from sensors regarding the main combustor operation and transmits commands to the valve to modulate the flow, if required, or remain fully open with no modulation.

Still referring to FIG. 1, fluid enters the combustion system 10 via fluid line 24 and flows through control valve 20 to provide cooling and prevents the harsh external temperature of the combustion gases from overheating control valve 20. In another example of the present invention the fluid comprises a combustible hydrocarbon fuel, for example a jet fuel such as kerosene and kerosene blends.

The active combustion control valve is designed for a Flow Number, FN, of from about 1 to about 5, wherein the Flow Number is determined as follows:

$$\text{Flow Number } (FN) = \frac{\dot{m}}{(P_{upstr} - P_{comb})^{0.5}}$$

and where;
$\dot{m}$ is the mass flow rate (pph)

$P_{upstr}$ is the upstream fluid pressure before the valve (psi)
$P_{comb}$ is the combustor pressure (psi)

Control valve 20 due to its proximity to the combustor has excellent control authority at very low flow rates, i.e. Flow Number up to about 5, due to its location along the main flow path of fluid based on its ability to suppress thereto-acoustic instabilities. Fuel injectors of gas turbines have a plurality of orifices normally oriented in a circular arrangement and central orifice or "pilot" orifice. In one example, active combustion control valve 20 modulates fluid flow through two or more orifices. In another example, active combustion control valve 20 modulates fluid flow through only one orifice, for example the pilot, to achieve combustion control. By only modulating the pilot flow, which is a small fraction of the injected flow, the overall high efficiency of remainder of the fuel injection system can be maintained. This retains the high overall engine efficiency even when the valve is modulating.

Figure 2:
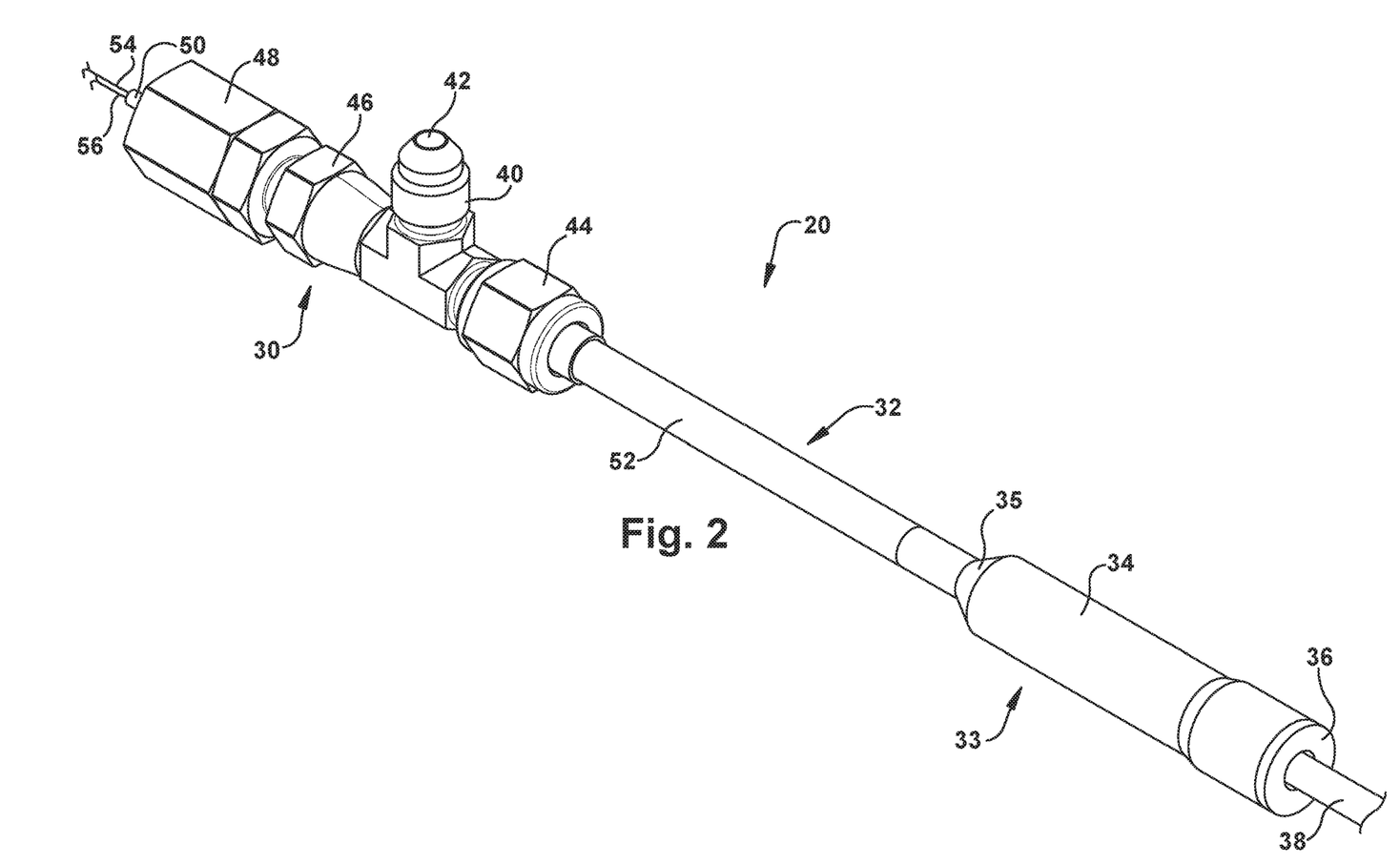
FIG. 2 is a perspective view of an active combustion control valve, according to an example of the present invention.

FIG. 2 is a perspective view of an active combustion control valve 20 illustrating several components, according to an example of the present invention. Control valve 20 includes a fluid inlet assembly 30 which connects to a co-axial fluid and electrical assembly 32 which connects to core valve assembly 33. In the example shown, core valve assembly 33 includes outer valve cover or outer valve housing 34 which has a tapered section 35 that is welded to the relatively smaller diameter co-axial fluid and electrical assembly 32. Outer valve housing 34 is connected to fluid outlet member 36 which is connected to fluid conduit 38 that leads to an injector, such as injector 18.

Fluid inlet assembly 30 includes fluid inlet fitting 40 having fluid inlet 42, which connects to co-axial fluid and electrical assembly 32 by connector nut 44. The fluid inlet assembly also includes conduit adapter 46 and conduit nut 48, which ensures that the fluid, for example jet fuel, does not leak into wiring conduit 50, which contains electrical conductors 54 and 56 which are in communication with controller shown in FIG. 1.

Figure 3:
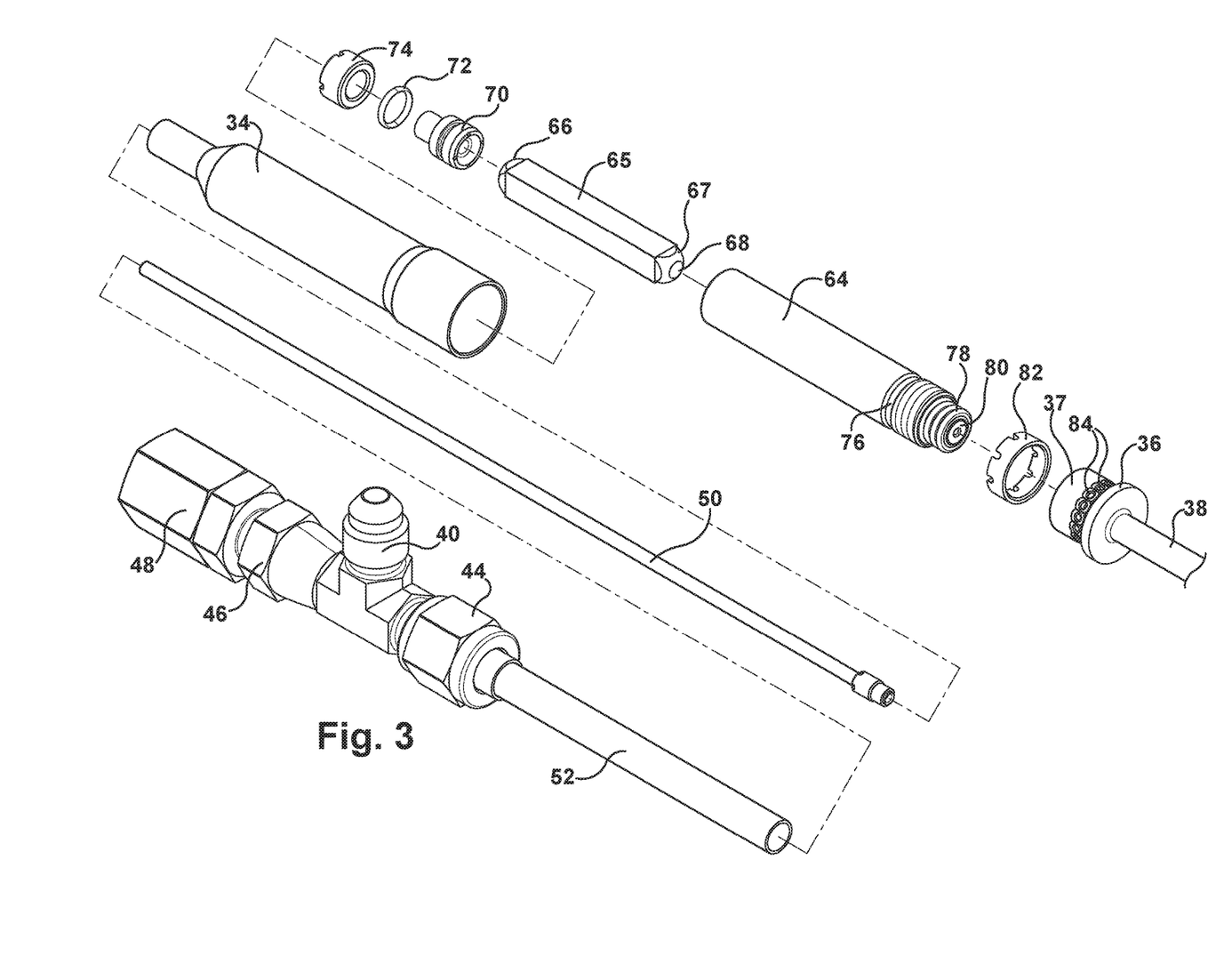
FIG. 3 is an exploded view of the active combustion control valve shown in FIG. 2, according to an example of the present invention.
Figure 4:
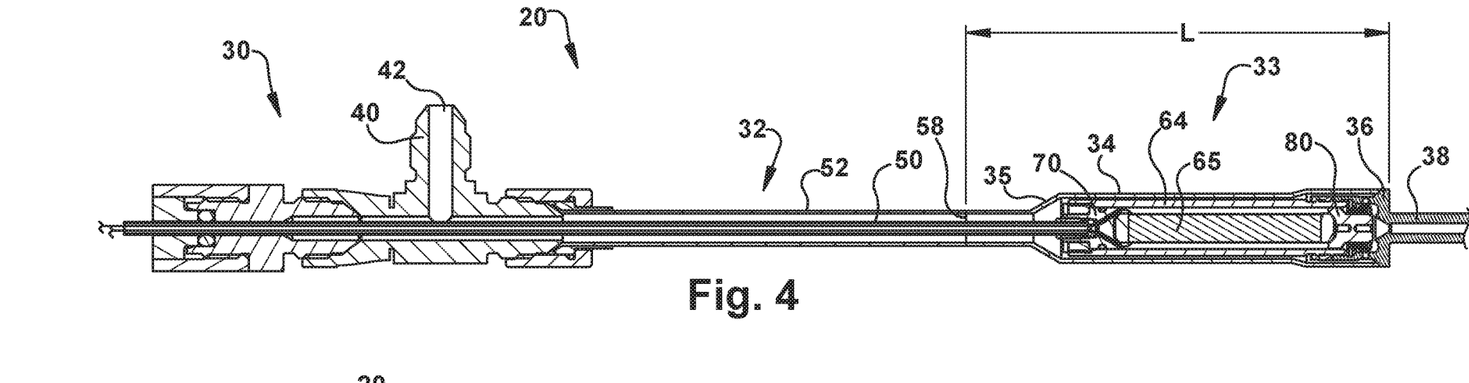
FIG. 4 is a cross-sectional view of the active combustion control valve shown in FIG. 2 and FIG. 3, according to an example of the present invention.

FIG. 3 is an exploded view of the active combustion control valve 20 shown in FIG. 2, and illustrates the co-axial fluid and electrical assembly 32 and several components of control valve 20 nested inside outer valve housing 34. Co-axial fluid and electrical assembly 32 includes fluid line 52 which houses wiring conduit 50.

Core valve housing 64 surrounds valve actuator 65 and optional end caps 66 and 67. In one example of the present invention, actuator 65 is a piezoelectric crystal material comprising stacked ceramic layers having electrical contacts that are in electrical communication with electrical conductors 54, 56 (FIG. 2). Core valve housing 64 prevents fluid, e.g. kerosene, from contacting actuator 65 and the electrical contacts therein, preventing chemical attack to the piezoelectric crystal and electrical conductors. Actuator end adaptor 70 is positioned adjacent one end of the actuator 65 and placed into contact with actuator 65 or optionally end cap 66. The actuator end adapter 70 is also positioned adjacent one end of the core valve housing 64 and in contact with the core valve housing 64. A locking ring 74 holds the actuator end adapter 70 in position relative to the core valve housing 64, and an o-ring 72 helps to prevent fluid flow between the core valve housing 64 and the actuator end adapter 70. A valve body or poppet 80 is positioned adjacent the opposite end of the actuator 65. A flexible member 78 positioned about the poppet 80 and is attached at one end to the poppet and at its opposite end to the core valve housing 64. Actuator 65, or optionally, end cap 67 is placed into contact with poppet 80. End caps 66 and 67 help ensure proper axial alignment of actuator 65 so that fluid flow through control valve 20 is consistent. Locking ring 82 is adjacent to, for example contacts, fluid outlet member 36 to retain the assembly and prevents fluid outlet member 36 from rotating. Fluid outlet member 36 includes a projection 37 having a plurality of fluid openings 84 which allow passage of fluid from fluid inlet 40 to fluid conduit 38. Fluid openings 84 can be sized to reduce the flow as it approaches valve seat 94 of fluid outlet member 36, thus ensuring precise control of fluid through the valve seat 94. Valve seat 94 surrounds valve orifice 96. The fluid outlet member 36, projection 37, and fluid conduit can be a single integrated element, separate elements, or combinations thereof.

Figure 5:
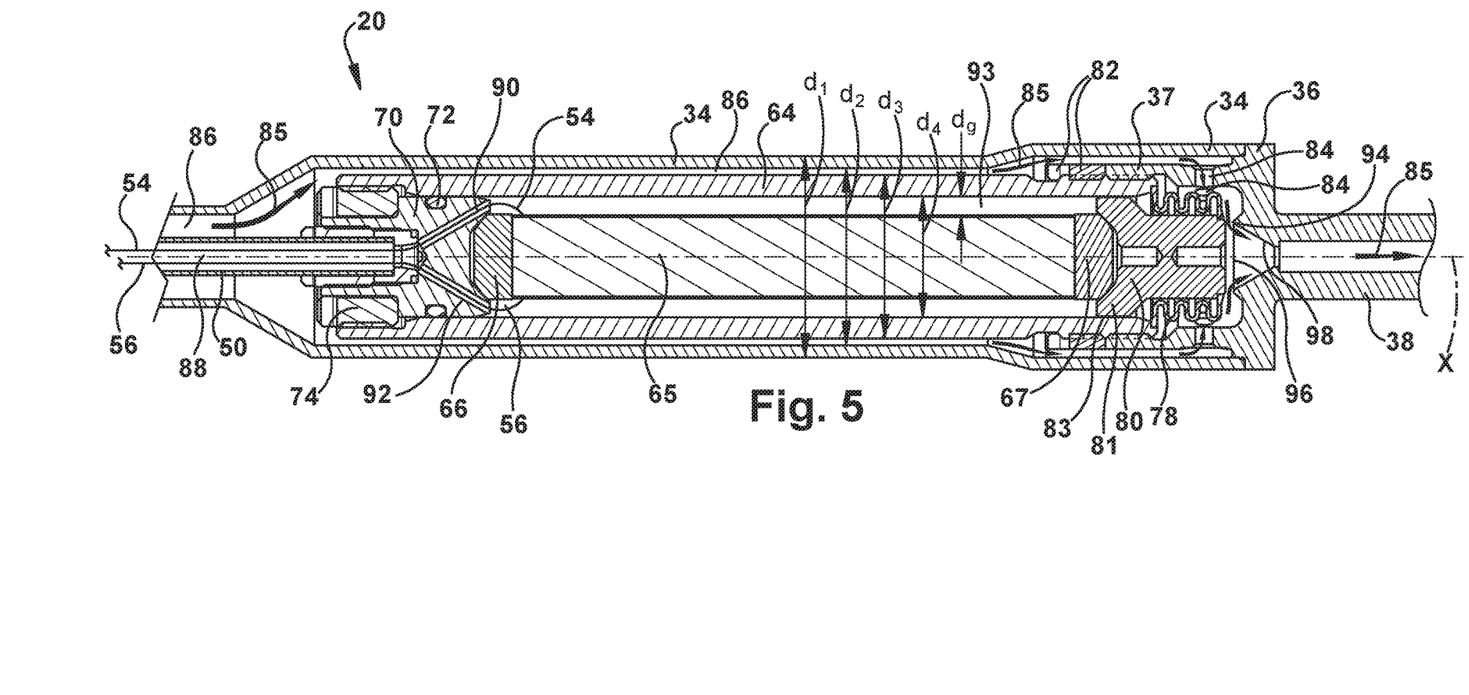
FIG. 5 is a cross-sectional view of the core section of the active combustion control valve assembly shown in FIG. 4, according to an example of the present invention.

FIGS. 4 through 7 are cross-sectional views of the active combustion control valve 20 shown in FIGS. 2 and 3. Control valve 20 defines a fluid passageway 86 that is in fluid communication with the fluid inlet 42 and fluid outlet 38. In combustion system 10, for example, fluid enters control valve 20 at fluid inlet fitting 40 at fluid inlet 42 and flows downstream through co-axial fluid and electrical assembly 32 and through core valve assembly 33, connected at weld line 58, and exits fluid conduit 38. FIG. 5 shows an expanded view of the core valve assembly 33 of control valve 20 and fluid flow, depicted by arrows 85, through passageway 86, through fluid opening 84, through valve orifice 94, through fluid outlet member 36 and through fluid conduit 38. In the example arrangement shown in FIG. 5, fluid flows between outer housing 34 and core housing 64. As fluid travels downstream toward fluid conduit 38, it flows through openings 84 of fluid outlet member 36 and around flexible member 78 and valve seat 94 and through valve orifice 96. Fluid outlet member 36 optionally includes a tapered conical wall 98 to funnel fluid from the orifice 96 to the fluid conduit 38. Control valve 20 also includes electrical channel 93 defined between the actuator 65 and core valve housing 64 for routing oppositely charged electrical conductors 54 and 56 alongside the actuator 65, and optionally, alongside the end cap 66. The oppositely charged electrical conductors 54, 56, complete a circuit through actuator 65 in response to an external control signal, for example a voltage or current communicated by controller 25 (FIG. 1). The dimensional gap, $d_g$, of electrical channel 93, or the distance between the actuator 65 and core valve housing 64 can vary such that the distance between the actuator 65 and ground, i.e. core housing 64, is enough to prevent electrical arcing. In one example, $d_g$ can vary from about 20-30% of the diameter or width of actuator 65, for example about 0.05 inches. Actuator end adaptor 70 includes channel openings 90 and 92, which can be angled, to guide electrical wiring through channel 88 of wiring conduit 50. Controller 25 (FIG. 1) sends current through the electrical conductors 54, 56 to actuator 65 to modulate fluid flow pulses of control valve 20 which can vary in frequency and amplitude.

Control valve assembly 33 of active combustion control valve 20 is small and robust. For example the overall dimension of the length, L, of control valve assembly 33 can range from about 0.25 inch to about 4 inches, in another example less than 3 inches, and in another example is about 2.75 inch measured as shown from weld area 58 (FIG. 4) to the end of fluid output member 36. The outer diameter of outer housing 34 indicated as $d_1$ can range, for example, from about 0.1 inch to about 0.75 inch, in another example from about 0.25 inch to about 0.65 inch and in another example about 0.45 inch to about 0.55 inch. The inner diameter indicated as $d_2$ can range, for example, from about 0.1 inch to about 0.7 inch, in another example from about 0.3 inch to about 0.60 inch and in another example about 0.40 inch to about 0.48 inch. The outer diameter of core valve housing 64 indicated as $d_3$ can range, for example, from about 0.2 inch to about 0.65 inch, in another example from about 0.25 inch to about 0.55 inch and in another example about 0.35 inch to about 0.45 inch, and the inner diameter indicated as $d_4$ can range, for example, from about 0.1 inch to about 0.50 inch, in another example from about 0.20 inch to about 0.40 inch and in another example about 0.25 inch to about 0.35 inch.

Figure 6:
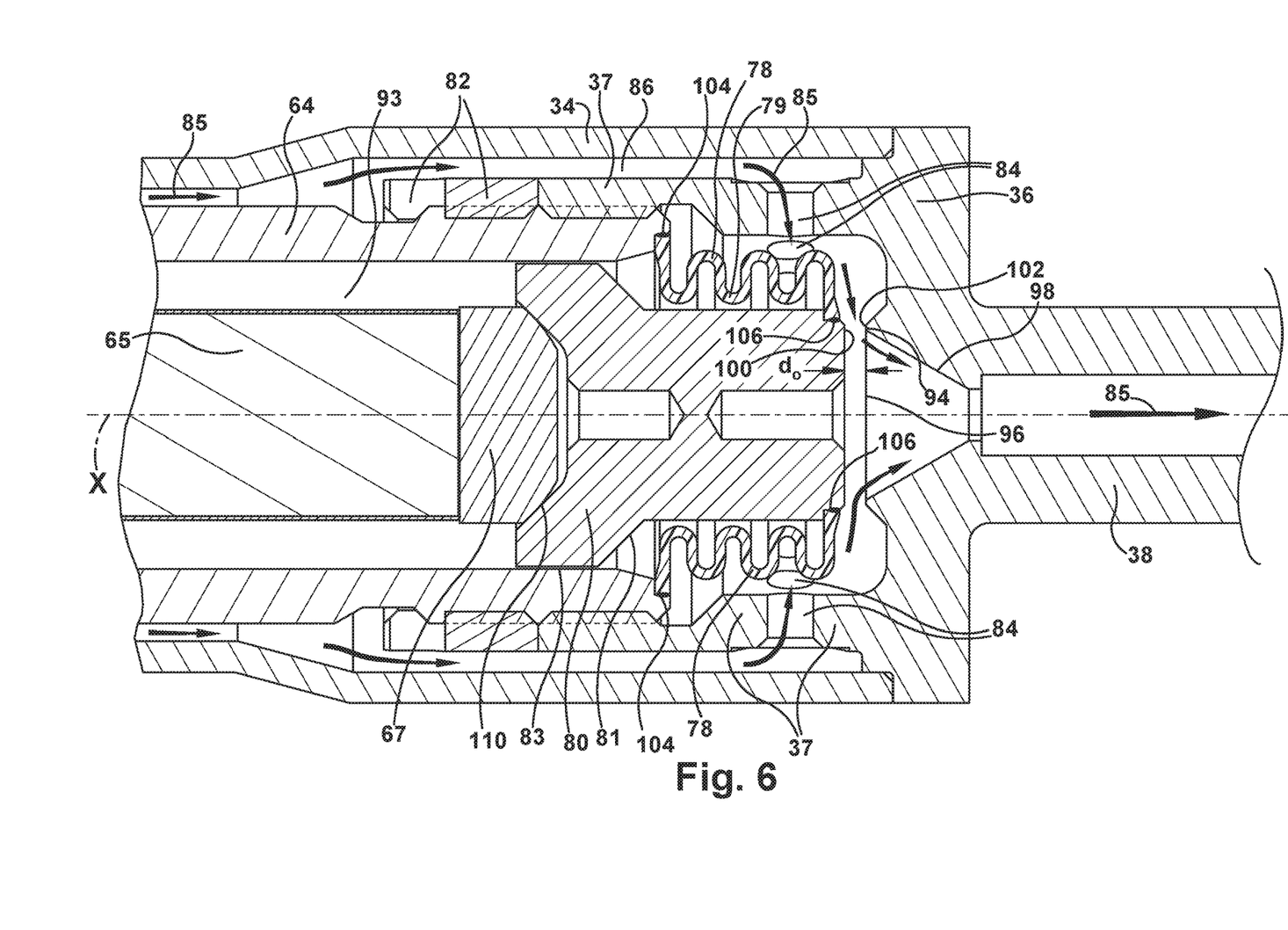
FIG. 6 is an expanded view of the core section of the active combustion control valve of FIG. 5 in the open position, according to an example of the present invention.
Figure 7:
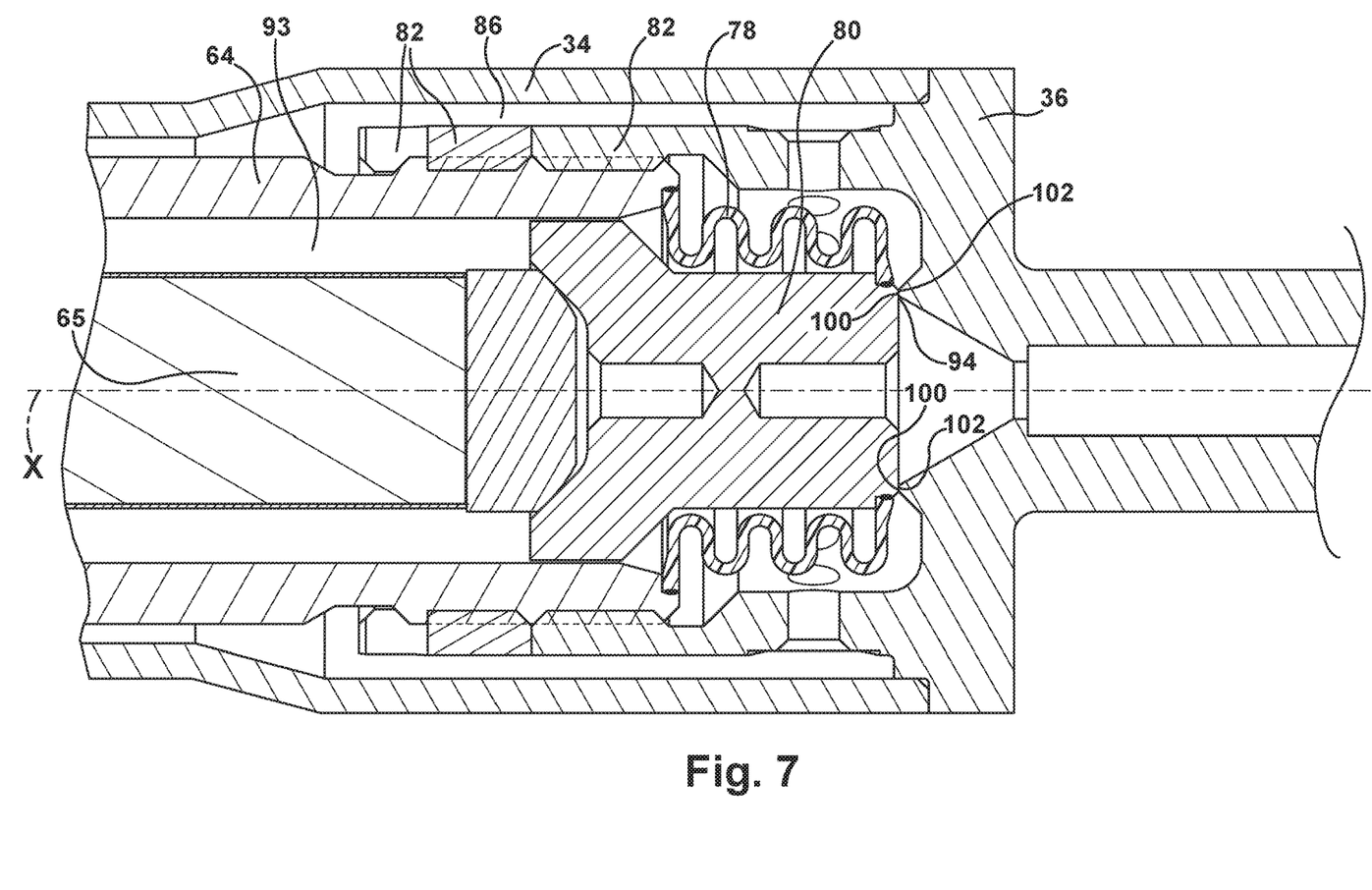
FIG. 7 is an expanded view of active combustion control valve in the closed position, according to an example of the present invention.

FIGS. 6 and 7 illustrate control valve 20 in an open position and closed position, respectfully. In the open position fluid flows downstream in the direction of arrow 85. Flexible member 78 is attached to core valve housing 64 at weld 104 and also attached to poppet 80 at weld 106. Flexible member 78 can be, for example, a bellows that has a plurality of alternating ridges and grooves. In a fully open position shown in FIG. 6 flexible member 78 is in a natural state having a gap having a distance, $d_0$, between surface 100 of poppet 80 and valve seat 94 of fluid outlet member 36 which is an opening permitting the passage of fluid, for example the maximum passage of fluid, to exit the valve orifice 96 to fluid conduit 38. In a closed position shown in FIG. 7 poppet 80 is moved axially downstream such that surface 100 of poppet 80 is in physical contact with valve seat 94 thereby closing off fluid flow through valve orifice 96 of fluid outlet member 36 and fluid conduit 38. Poppet 80 is sized to be closed against valve seat 94 when actuator 65 is fully extended, for example when full voltage is applied.

As an electrical signal, for example a change in voltage or current is applied to control valve 20, actuator 65 moves poppet 80 toward valve seat, and the poppet 80 can move toward valve seat 94 from fully open to fully closed position or any distance between the fully open and fully closed positions to throttle fluid flow. Flexible member 78 has a spring tension that biases poppet 80 against actuator 65 in a direction axially opposite the valve seat 94. As mentioned above, actuator 65 can be a piezoelectric crystal material that expands when voltage is applied. For example, the piezoelectric crystal is a "stack" of ceramic layers of material each containing an electrode (not shown) that is in electrical communication with electrical conductors 54, 56 (FIG. 5). In operation, voltage applied to the piezoelectric crystal is energized causing the various layers to transmit force to each successive layer. This causes the piezoelectric stack to expand to a larger dimension and to transmit force to poppet 80 and urging it toward valve seat 94 to decrease the distance between surface 100 of poppet 10 and surface 102 of valve seat 94 to decrease or completely stop fluid flow to valve orifice 96 and out of control valve 20. The fluid flowing through the active combustion control valve 20 can have a temperature that is several hundred degrees cooler than the ambient temperature surrounding the control valve, and thus, the fluid can provide cooling or mitigate the heat transfer and prevent the harsh external gas temperatures around the valve assembly from overheating components, for example the actuator 65, of the control valve. In other words, the active combustion control valve is self-cooling to operate in severe thermal combustion environments, for example up to 1,000° F., up to 1,200° F., that far exceed the operating temperature of components of the control valve, for example the operating temperature of the actuator, that has an operating range of about −50° F. to about 350° F., for example. Various piezoelectric materials can be used in the active combustion control valve 20 depending upon the operating environment and the operating voltage desired. In one example the operating temperature a piezoelectric crystal actuator 65 can withstand ranges from about −50° F. to about 400° F., −40° F. to about 300° F. and in another example, from about −4° F. to about 392° F. Although active combustion control valve 20 can include an actuator that is a piezoelectric crystal, the control valve 20 can, nevertheless, withstand the combustion environments having temperatures that exceed 1,000° F. or even 1,200° F.

Figure 8:
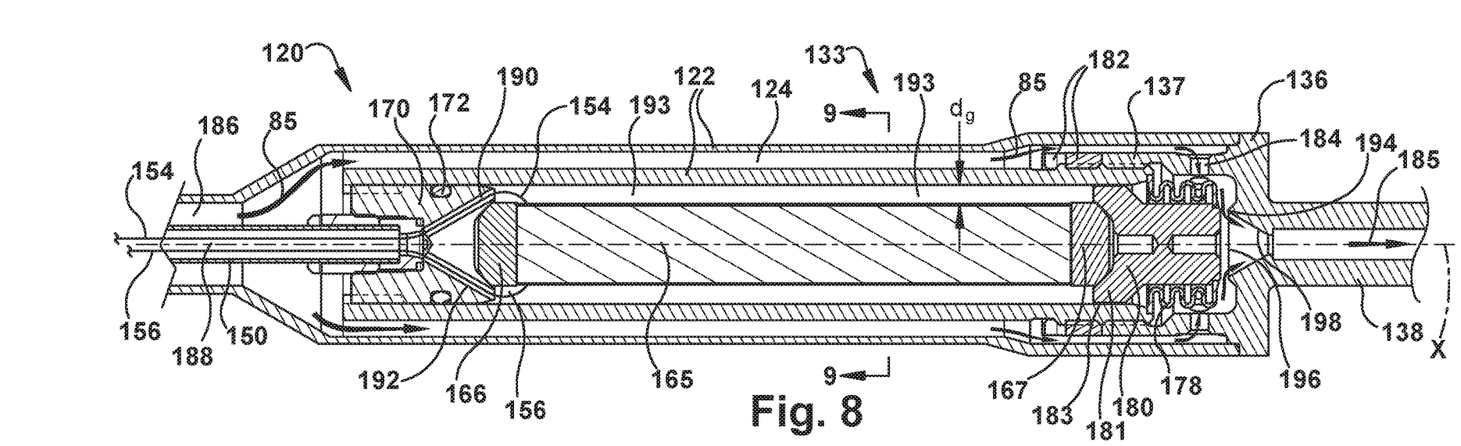
FIG. 8 is a cross-sectional view of another example embodiment of an active combustion control valve, according to an example of the present invention.
Figure 9:
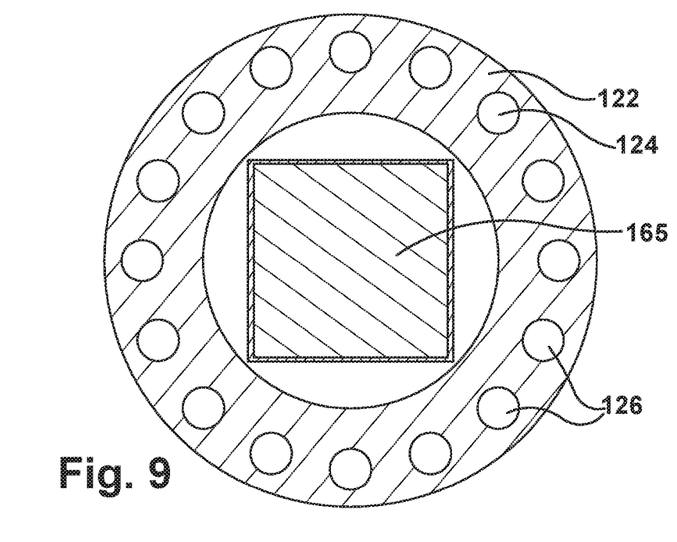
FIG. 9 is a radial cross-sectional view of the active combustions control valve of FIG. 8 taken along the lines 9-9, according to an example of the present invention.

FIGS. 8 and 9 illustrate alternative examples of active combustion control valves, in accordance with the present invention. FIG. 8 shows a longitudinal cross-sectional view of another example of a core valve assembly 133 of an active combustion control valve 120 having many components that are similar or identical to those described with respect to FIG. 1-7. Core valve assembly 120 has a core valve housing 122 having a fluid passageway 124 that runs through the core valve housing 122 and which is in communication with fluid outlet member 136 and fluid conduit 138. For example, fluid passageway 124 can be a single annular passageway through core housing 122, and in another example fluid passageway 124 can be one of a plurality of fluid passageways through core valve housing 122. Core valve housing surrounds valve actuator 165 and optional end caps 166 and 167. Core valve housing 122 prevents fluid, for example fuel, from contacting actuator 165 and electrical conductors 154 and 156. FIG. 9 is a radial cross-sectional view of the core valve assembly 120 of FIG. 8 taken along the lines 9-9 and shows that core valve housing 122 has a plurality of passageways 126, in addition to passageway 122, for transporting fluid through combustion control valve 20. The radial cross-section shows the shape of the passageway's 124, 126 as circular, although the passageway's can have any shape, for example rectangular, oval, etc. Active combustion control valve 120 having core valve assembly 133 can include the same fluid inlet assembly 30 (FIGS. 2-4) and co-axial fluid and electrical assembly 32 (FIGS. 2-4) as described above with respect to active combustion control valve 20.

Referring to FIG. 8, the components of the core valve assembly 133 include many of the same components as in control valve 120. For example, co-axial fluid and electrical assembly wiring conduit 150. Actuator end adaptor 170 is positioned adjacent one end of the actuator 165 and placed into contact with actuator 165 or optionally end cap 166. The actuator end adapter 170 is also positioned adjacent one end of the core valve housing 122 and in contact with the core valve housing 122. Actuator end adapter 170 includes an o-ring 172 helps to prevent fluid flow between the core valve housing 64 and the actuator end adapter 170. A valve body or poppet 180 is positioned adjacent the opposite end of the actuator 165. A flexible member 178 positioned about the poppet 180 and is attached at one end to the poppet and at its opposite end to the core valve housing 122. Actuator 165, or optionally, end cap 67 is placed into contact with poppet 180. End caps 166 and 167 help ensure proper axial alignment of actuator 165. Locking ring 82 is adjacent to, for example contacts, fluid outlet member 136 to retain the assembly and prevents fluid outlet member 136 from rotating. Fluid outlet member 136 includes a projection 137 having a plurality of fluid openings 184 which allow passage of fluid from fluid inlet 40 (FIGS. 2-4) to fluid conduit 138. As fluid travels downstream, as depicted by arrows 185, it flows through passageway 124 of core valve housing 122, through fluid opening 184 and around flexible member 178 and valve seat 194, through valve orifice 196 of fluid outlet member 136, and through fluid conduit 138. Fluid outlet member 136 optionally includes a tapered conical wall 198 to funnel fluid from the orifice 196 to the fluid conduit 38. Control valve 120 also includes electrical channel 193 defined between the actuator 165 and core valve housing 122 for routing oppositely charged electrical conductors 154 and 156 alongside the actuator 165, and optionally, alongside the end cap 166.

During operation, as an electrical signal, for example voltage or current, is applied to control valve 120, actuator 165 moves poppet 180 toward valve seat 194, and the poppet 180 can move toward valve seat 194 from fully open to fully closed position or any distance between the fully open and fully closed positions to throttle fluid flow. Flexible member 178 has a spring tension that biases poppet 180 against actuator 165 in a direction axially opposite the valve seat 194. As mentioned above, with respect to actuator 65 of control valve 20 (FIGS. 2-7), actuator 165 can be a piezoelectric crystal material that expands when voltage is applied. The expansion of the piezoelectric stack transmits force to poppet 180 and urging it toward valve seat 194 to decrease or completely stop fluid flow to valve orifice 196 and out of core valve assembly 133. The fluid flowing through the active combustion control valve 120 can have a temperature that is substantially less than the ambient temperature surrounding the control valve, and thus prevents the some components from reaching temperatures that exceed their functional and/or rated temperatures.

In the several example embodiments of control valves, including control valves 20, 120, described above, the components withstand severe ambient combustion temperatures and pressures described above. Actuator 65, 165 can modulate fluid flow at variable power levels. In other words it can modulate as a function of power that is delivered to the actuator. Actuator 65, 165 is highly responsive to voltage applied and can operate at frequencies up to about 3,000 Hz, in another example, at frequencies up to about 2,000 Hz, and in another example from about 1,000 Hz to about 1,500 Hz. Accordingly, in one example, actuator 65, 165 is a piezoelectric crystal stack or a doped piezoelectric crystal stack. Piezoelectric ceramics convert mechanical energy into electrical energy and conversely electrical energy into mechanical energy. Examples of piezoelectric crystal include ceramic piezoelectric crystals, including but not limited to Zinc-Zirconium-Titanium or Lead-Zirconium-Titanium (PZT) crystals. A suitable piezoelectric crystal that can be used for actuator 65, 165 includes, but is not limited to, a stack multilayer piezoelectric ceramic actuator having the registered trademark PICMA® P-882-P-888. This Zinc-Zirconium-Titanium oxide ceramic stack actuator expands in the axial dimension of control valve 20, 120 up to about 0.001 inch, or can vary slightly and expand up to a dimension that ranges from about 0.0008 inch to 0.0012 inch, for example, with an applied voltage that ranges from 0 to 100 Volts. Piezoelectric crystal actuators having different voltage ranges and corresponding dimensional changes can also be used. The end caps 66, 67, 166, 167 can be a material that is compatible with the actuator 65, 165. For example, a control valve 20, 120 having an actuator 65, 165 that is a piezoelectric crystal or ceramic, a suitable material for end caps is a ceramic, for example, silicon nitride, $Si_3N_4$.

In one example, the material composition of core valve core housing 64, 164 has a coefficient of thermal expansion (CTE) that is similar or substantially equal to actuator 65 over the operating temperature range of the actuator to ensure that valve actuation remains substantially unaffected by environmental temperature ranges. Poppet 80, 180 is operatively coupled or connected to the actuator 65, 165 via end cap 67, 167 and is also operatively coupled or connected with the core valve housing 64, 164 via flexible member 78, 178. Since the modulation of fluid flow is based on the displacement of actuator 65, a core valve housing 64 that has a similar coefficient of thermal expansion (CTE) to that of the actuator 65 ensures that flexible member 78 and poppet 80 are moved accurately and consistently relative to core valve housing 64. Accordingly, in one example, the longitudinal expansion of the core valve housing 64, 164 is less than about 60% of the longitudinal extension of the actuator 65, in another example less than about 25%, and in another example less than about 10% over the operating temperature of the actuator, for example an operating range of −50° F. to about 350° F. The coefficient of thermal expansion of core valve housing 64 can range, for example, from about $0.55 \times 10^{-6}$ inches/inch° F. to about $1.55 \times 10^{-6}$ inches/inch° F. The extension or displacement of actuator 65 toward valve seat 94, 194 would cause improper modulation of fluid if the core valve housing 64 expanded at a significantly different rate relative to the actuator 65 under operating conditions. An example of a materials used in the core valve housing 64, 122, include, but are not limited to, iron-nickel-cobalt based alloys having from about 20% to about 40% by weight nickel and from about 3% to about 8% cobalt. A suitable material used for the core valve housing 64, 122, is an iron-nickel-cobalt alloy, for example Super Invar 32-5 available from High Temp Metals of Sylmar, Calif.

Most components of the valve, and with the exception of the core valve housing 64, are made of an oxidation and corrosion resistant material for use in extreme environments subjected to pressure and heat, for example pressures up to about 500 psi and temperatures up to about 1,250° F. An example of materials used in the outer valve housing 34 include, but are not limited to, austenite nickel-chromium based super alloys having from about 40% to about 75% by weight nickel and from about 14% to about 30% chromium. Materials used for the outer valve housing 34 when active combustion control valve 20 is used in a jet engine or a turbine engine, for example, require high fatigue resistance over extended time, in addition to excellent chemical resistance to a variety of fuels. These materials should also have excellent physical properties that allow for practical fabrication such as welding. A material of construction for several components of the example control valves herein are iron-nickel-chromium based alloys, for components that include, but are not limited to, the outer valve housing 34 (FIGS. 2-7), the wiring conduit 50, 150, and fluid line 52,152, of co-axial fluid and electrical assembly, actuator end adaptor 70,170, locking rings 74, 174, 82 and 182, flexible member 78, 178, poppet 80, 180, fluid outlet member 36, 136, and projection 37, 137, valve seat 94, 194, and fluid conduit 38, 138. An example of a suitable iron-nickel-chromium based alloy is Inconel® alloy 625 which is available from Special Metals Corporation of New Hartford, N.Y. The various Inconel alloy compositions have differing properties making them stronger, or more weldable, or more corrosion resistant, or more hydrogen embrittlement resistant. Inconel 625 has been found to have suitable fatigue life and weldability and exhibits high strength at elevated temperatures inside combustion engines. O-rings 72, 172 can be made of rubber, for example, butyl rubber that provides a hermetic seal at temperatures up to about 400° F. or in another example up to about 400° F.

Flexible member 78 seals fluid between flexible member 78 and valve seat 36 and prevents fluid flow upstream toward actuator 65 and electrical channel 93. Flexible member 78 also provides compressive force or counter-resistance on the actuator 65, for example, when it is displaced axially toward valve seat. In one example flexible member is a bellows that has a plurality of alternating ridges and grooves is engineered to provide a spring force, for example from about 40 pound-force to about 80 pound-force, at high cycles, for example, up to about 3.5 billion or 5 billion cycles.

Accordingly, a method of modulating or controlling the flow of fluid in a combustion engine includes passing fluid through a passageway of an active combustion control valve; cooling the control valve with the fluid flowing through the passageway of the valve; and applying voltage to an actuator of the control valve to cause the actuator to move to change the flow of the fluid that exits the control valve. The control valve has the ability to cycle—that is, open, close and open, at up to about 3,000 Hz, in another example up to about 2,000 Hz, in another example at about 1,500 Hz and in another example, at about 1,000 Hz.

EXAMPLES

The following example is provided to more thoroughly illustrate embodiments of the present invention and operational advantages. There are a wide variety of alternative examples of active combustion control valves within the scope of the present invention which should not be limited to the particular example provided herein.

The operation of an example active combustion control valve of the present invention, for example the design shown in FIGS. 2-7 was tested via computer simulation. The computer simulations were related to internal operation of the active combustion control valve. Computer simulations were conducted to predict internal loads on all of the components and to ensure there were no resonance frequencies that would occur when the valve operated at frequencies up to about 2,000 Hz. The computer simulations were also conducted to predict the temperatures of the internal components of the active combustion control valve to ensure they would remain cool when placed in a high temperature environment of at least about 1,200° F.

Figure 10:
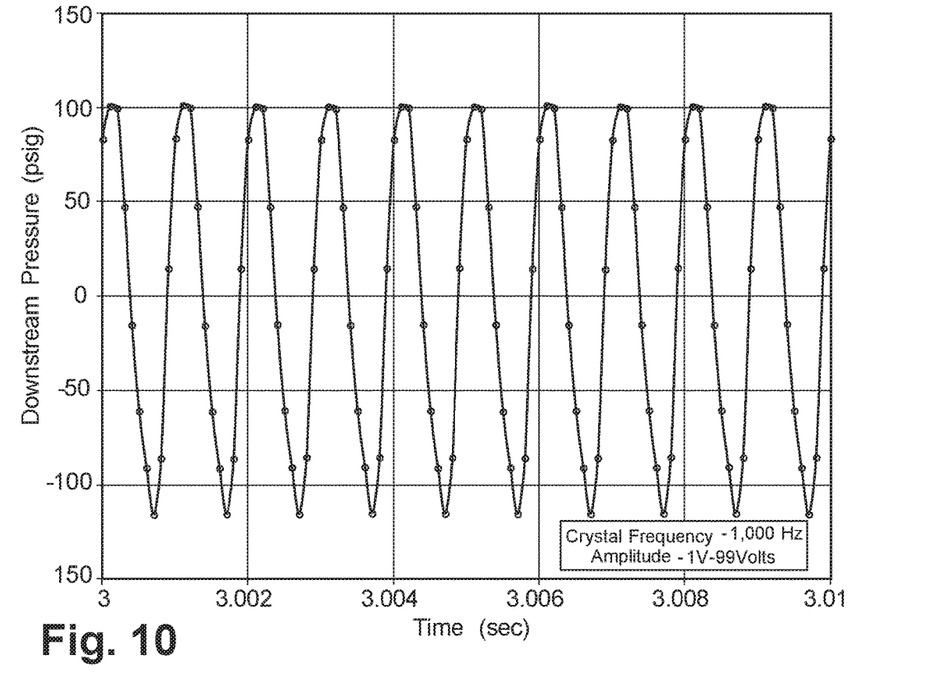
FIG. 10 is a graph of downstream dynamic pressure versus time of fluid flow being modulated by the active combustion control valve modulating at 1,000 Hz, according to an example of the present invention.
Figure 11:
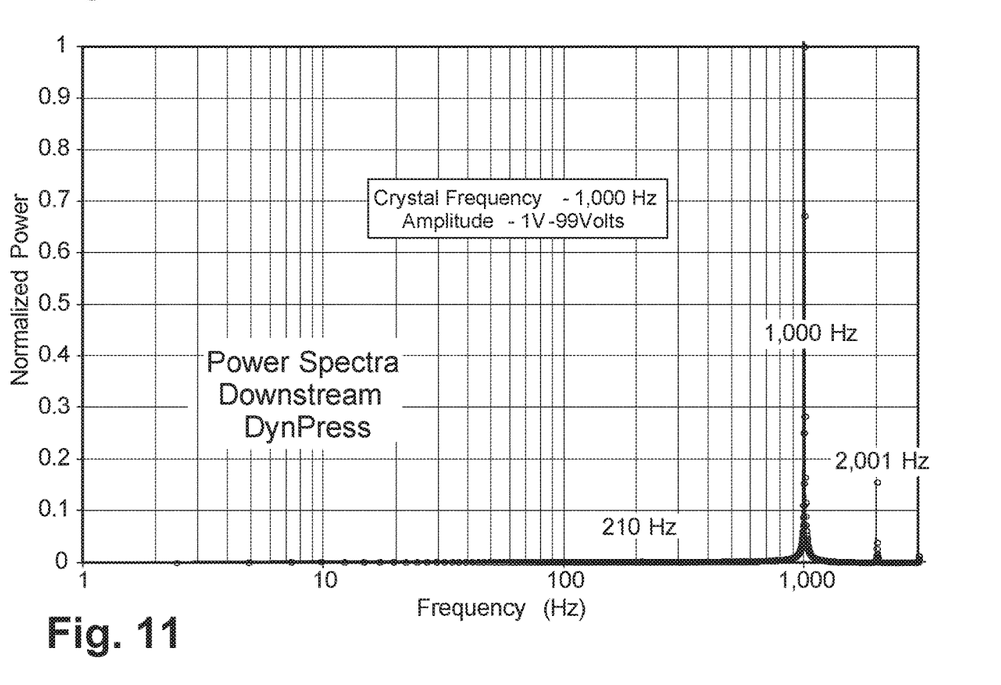
FIG. 11 is graph of normalized power versus frequency of the active combustion control valve modulating at 1,000 Hz, according to an example of the present invention.

FIG. 10 shows a graph of the pressure versus tune when fluid flow entering the active control valve at a pressure of about 345 psi and is modulated at 1,000 Hz. The dynamic pressure downstream of the valve varies from +/−100 psi verifying the valve's ability to modulate the fluid flow. In FIG. 11 the power spectra of the computer simulation of FIG. 10 shows the valve modulating precisely at 1,000 Hz, thus without unwanted random frequencies being present, and with a higher order harmonic occurring at 2,001 Hz. Active combustion control valve has excellent control authority based on its ability to suppress thereto-acoustic instabilities.

Although the examples of active combustion control valves shown in FIGS. 1-8 can include a fluid inlet assembly 30, a co-axial fluid and electrical assembly 32, and a core valve assembly 33 and 133, the purpose of the fluid and electrical assembly is primarily to enable the core valve assembly 33, 133, to be positioned in close proximity to injector 18 (FIG. 1). In appropriate circumstances the fluid and electrical assembly 32 could be shortened in length, configured with a bend or angle, or eliminated entirely. If the fluid and electrical assembly 32 were eliminated, the fluid inlet assembly 30 and the core valve assembly 33 could be integral or fixed together.

While the present invention has been illustrated by the description of embodiments thereof, and while the embodiments have been described, it is not the intention of the applicants to restrict or in any way limit the scope of the appended claims to the details herein. Additional advantages and modifications will readily appear to those skilled in the Having described the invention, we claim:

1. An active combustion control valve comprising:
an outer valve housing;
a core valve housing;
an actuator disposed within the core valve housing;
a poppet movable with the actuator relative to the core valve housing;
a valve seat, the poppet being disposed between the valve seat and the actuator;
a passageway, which forms an annular passageway portion defined by the outer valve housing and the core valve housing; and
a flexible member which surrounds at least a portion of the longitudinal length of the poppet to prevent fluid flowing in the passageway from contacting the actuator, wherein the flexible member has a first portion fixed to the core valve housing and a second portion movable with the actuator and poppet relative to the core valve housing.

2. The active combustion control valve of claim 1, wherein the passageway is in fluid communication with the core valve housing, a radially external surface of the flexible member and the valve seat.

3. The active combustion control valve of claim 1, wherein the poppet is movable into and out of contact with the valve seat.

4. The active combustion control valve of claim 1, wherein the flexible member is a bellows.

5. The active combustion control valve of claim 2, wherein the passageway extends along the length of the actuator.

6. The active combustion control valve of claim 1, wherein the flexible member exerts a spring force against the poppet in the direction of the actuator.

7. The active combustion control valve of claim 1, wherein the actuator comprises a piezoelectric crystal that is responsive to a change in voltage.

8. The active combustion control valve of claim 1, wherein the control valve modulates flow at a frequency up to 2,000 Hz.

9. The active combustion control valve of claim 1, wherein the core valve housing is made of a material having a coefficient of thermal expansion (CTE) that ranges from $0.55 \times 10^{-6}$ inches/inch° F. to $1.55 \times 10^{-6}$ inches/inch° F.

10. The active combustion control valve of claim 1, wherein the core valve housing is capable of a longitudinal expansion and the actuator is capable of longitudinal expansion along an axis with an increase in the operating temperature during operation, and wherein the longitudinal expansion of the core valve housing is less than 60% of the longitudinal extension of the actuator over the range of operating temperature of the actuator.

11. The active combustion control valve of claim 2, wherein the valve seat receives the fluid flow through an opening along the passageway adjacent the flexible member and upstream of a valve seat orifice.

12. The active combustion control valve of claim 2, wherein the active combustion control valve has a fluid inlet and a fluid outlet, the passageway extending from the fluid inlet to the fluid outlet along at least a portion of a length of the core valve housing, the fluid outlet being disposed adjacent to the valve seat.

13. An active combustion control valve, comprising:
an outer valve housing;
a core valve housing extending along an axis;
an actuator extending along the axis;
a poppet movable with the actuator relative to the core valve housing;
a valve seat; and
a fluid passageway for directing fluid along the length of the core valve housing for cooling and directing the fluid toward the valve seat, the fluid passageway forming an annular passageway portion defined by the outer valve housing and the core valve housing; and
a flexible member which surrounds at least a portion of the longitudinal length of the poppet to prevent fluid flowing in the passageway from contacting the actuator, wherein the flexible member has a first portion fixed to the core valve housing and a second portion movable with the actuator and poppet relative to the core valve housing.

14. The active combustion control valve of claim 13, wherein the poppet is movable toward and away, from the valve seat to affect a flow of the fluid passing between the poppet and the valve seat, the actuator being operative to move the poppet relative to the valve seat in response to a change in an electrical signal applied to the actuator.

15. The active combustion control valve of claim 13, wherein the core valve housing is made of a material having a coefficient of thermal expansion that ranges from $0.55 \times 10^{-6}$ inches/inch° F. to $1.55 \times 10^{-6}$ inches/inch° F.

16. The active combustion control valve of claim 14, wherein:
the fluid passageway extends parallel to the axis along at least a portion of the length of the core valve housing to direct the fluid flowing toward the valve seat into contact with the core valve housing to cool the housing; and
the actuator comprises a piezoelectric crystal that is responsive to a change in voltage.

17. A method for controlling a flow of fluid in a combustion engine, comprising:
an active combustion control valve comprising:
an outer valve housing;
a core valve housing;
an actuator disposed within the core valve housing;
a poppet movable with the actuator relative to the core valve housing:
a valve seat, the poppet being disposed between the valve seat and the actuator;
a passageway, which forms an annular passageway portion defined by the outer valve housing and the core valve housing; and
a flexible member which surrounds at least a portion of the longitudinal length of the poppet to prevent the fluid flowing in the passageway from contacting the actuator, wherein the flexible member has a first portion fixed to the core valve housing and a second portion movable with the actuator and poppet relative to the core valve housing;
passing the fluid through the passageway to cool the active combustion control valve, the passageway extending from a fluid inlet port to a valve orifice; and
applying an electrical signal to the actuator to cause the actuator to move to change the flow of the fluid that exits the control valve.

18. The method of claim 17, comprising:
moving the poppet and the flexible member toward the valve seat such that the poppet displacement modulates the flow of fluid through the valve orifice.

19. The method of claim 17, wherein the fluid transported through the control valve has a Flow Number (FN) that ranges from 1 to 5.

20. The method of claim 17, wherein the fluid transported through the control valve comprises a combustible hydrocarbon fuel.

21. The method of claim 17, wherein the actuator comprises a piezoelectric crystal and wherein the passageway directs fluid passing through the passageway into contact with the valve core hosing that surrounds the piezoelectric crystal, the coefficient of thermal expansion (CTE) of the core valve housing ranges from about 60% to about 120% of the longitudinal expansion of the actuator.

22. A combustion system comprising:
a combustion engine; and
an active combustion control valve comprising:
an outer valve housing;
a core valve housing extending along an axis;
an actuator disposed within the core valve housing extending along the axis;
a poppet movable with the actuator relative to the core valve housing:
a valve seat; and
a passageway along the length of the core valve housing for cooling and directing fluid toward the valve seat, the passageway forming an annular passageway portion defined by the outer valve housing and the core valve housing; and
a flexible member which surrounds at least a portion of the longitudinal length of the poppet to prevent the fluid flowing in the passageway from contacting the actuator, wherein the flexible member has a first portion fixed to the core valve housing and a second portion movable with the actuator and poppet relative to the core valve housing.

23. The combustion system of claim 22, comprising an electrical controller in electrical communication with the control valve.

24. The combustion system of claim 22, wherein the combustion engine is a jet engine or a gas turbine.

25. The combustion system of claim 22, wherein the combustion engine is a jet engine and the combustion system comprises a fuel injector.

26. The combustion system of claim 25, wherein the active combustion control valve is directly connected to the fuel injector.

27. The combustion system of claim 25, wherein the active combustion control valve is located a distance within six inches from the fuel injector.

28. The combustion system of claim 25, wherein the fuel injector comprises a plurality of orifices and the active combustion control valve is controlling the fluid flow to only one orifice.

29. The active combustion control valve of claim 13, comprising:
wherein the flexible member is a bellows; and
the poppet being disposed between the valve seat and the actuator.

* * * * *